UNITED STATES PATENT OFFICE.

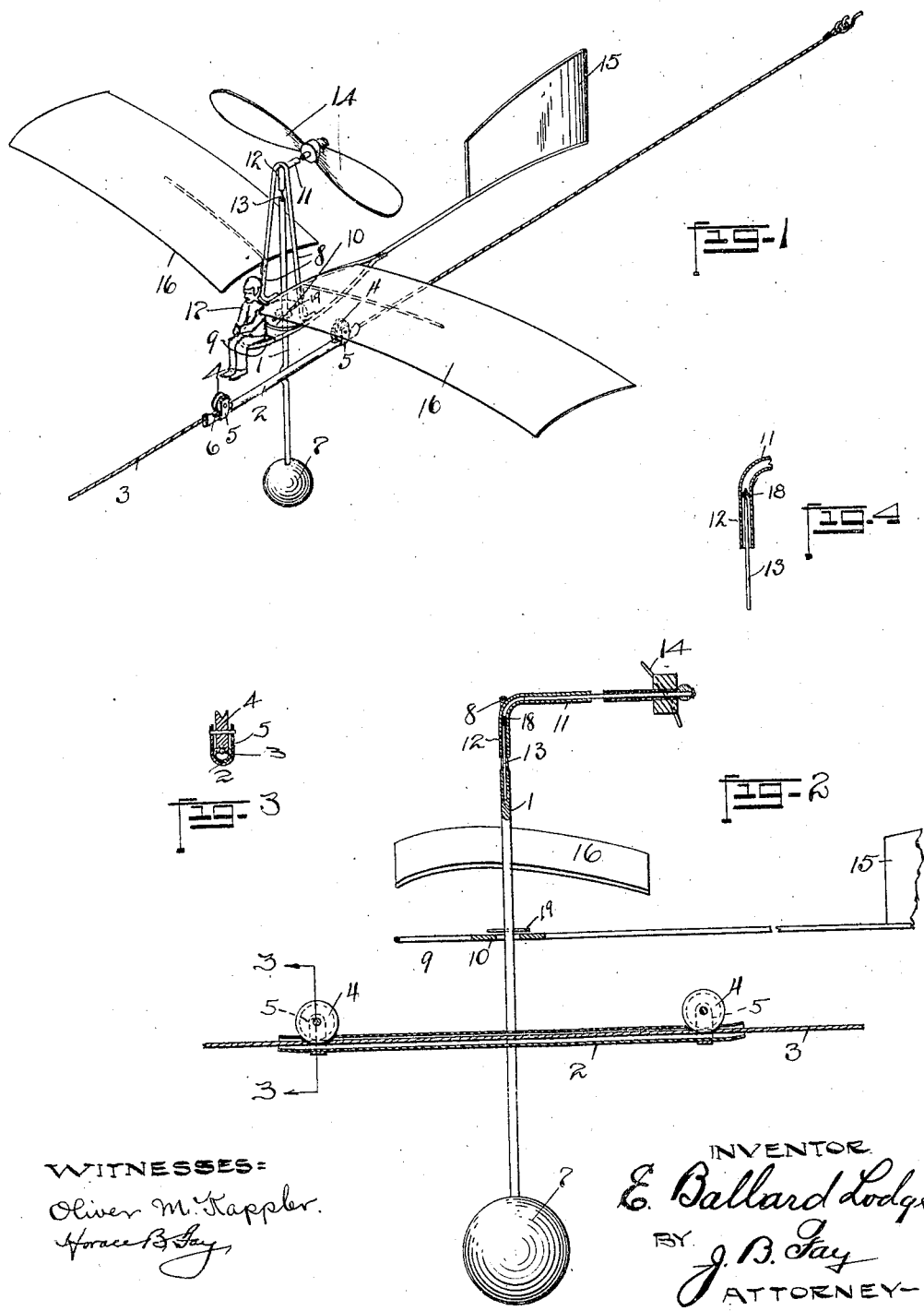

EDWARD BALLARD LODGE, OF CLEVELAND, OHIO.

AERONAUTIC TOY.

1,087,306.  Specification of Letters Patent.  Patented Feb. 17, 1914.

Application filed February 21, 1912. Serial No. 678,983.

*To all whom it may concern:*

Be it known that I, EDWARD BALLARD LODGE, a citizen of the United States, and a resident of Cleveland, county of Cuyahoga, and State of Ohio, have invented a new and useful Improvement in Aeronautic Toys, of which the following is a specification, the principle of the invention being herein explained and the best mode in which I have contemplated applying that principle, so as to distinguish it from other inventions.

The present invention relates to an aeronautic toy for the amusement of children.

It comprises in general, a frame with a plurality of planes extending therefrom, and a propeller and rudder, thus resembling an aeroplane.

The device may be made in any desired size, the smaller sizes being particularly adapted for use indoors. When made in a larger size it may be used as an advertising device, displaying advertisements on the wings or planes and on the rudder.

To the accomplishment of this and related ends, said invention, then, consists of the means hereinafter fully described, and particularly pointed out in the claims.

The annexed drawing, and the following description, set forth in detail certain mechanism embodying the invention, such disclosed means constituting, however, but one of various mechanical forms in which the principle of the invention may be used.

In said annexed drawing:—Figure 1 is a view in perspective of my device, showing it when attached to a cable; Fig. 2 is a vertical central section, Fig. 3 is a section on the line 3—3 in Fig. 2, and Fig. 4 is a detailed view similar to Fig. 2.

It will be understood that my device may take any one of numerous forms, the exact form being determined by the size and price at which the device is to be sold. When made in larger size, the device will appear more complicated, and for this reason the following description will be given only of the simplest form, which is here illustrated, although it will be seen that it is a matter of indifference whether or not the frame and the various other members take the exact form here shown.

In Fig. 1 there is shown a main frame comprising a vertically disposed member 1, to which is attached a laterally extending member 2 which is hollow, and is adapted to receive and inclose a cable 3. Pulleys 4, mounted on lugs 5 attached to the member 2, enter this member through slots 6, and engage the cable, thus eliminating any sliding friction, since the cable does not contact the sides of member 2 at all. To the bottom of the main frame 1, there will be attached a weight 7 which may be of any suitable size and shape, and which will serve to retain the device in an upright position at all times, as the center of gravity is considerably below the point of attachment of the member 2, which is the level of the point of support.

Rotatably attached to the main frame is a secondary frame comprising two vertically disposed members 8 which are attached together at the upper ends, and which at their lower ends are attached to a bow-shaped member 9, upon which is mounted a disk 10, adapted to encircle, and if desired, to journal the member 1 of the main frame. A short cross member 19, may be attached to the former, to prevent the disengagement of the main and secondary frames. Extending from the secondary frame at the top, is a shaft 11 which is here shown as tubular, and has a vertically extending portion 12, which extends over an upwardly extending shaft 13, attached to the main frame. Rotatably mounted on the horizontal shaft 11, is a rotatable member 14 having a plurality of blades thus representing a propeller, the exact construction of these several members, and their arrangement being more clearly shown in Fig. 2.

It will be seen in Fig. 4 that in the present device the member 13 will have a sharpened upper end, and may in practice be a needle which will engage the conical bearing 18 which will be formed in the member 11. It is for this purpose that the disk 10 is made to loosely inclose the main frame 1 in order that the secondary frame may oscillate slightly on the end of the member 13. By using a sharpened conical bearing, such as is here shown, the secondary frame is permitted to rotate freely upon the main frame, and it will be seen that the slightest wind pressure against the curved rudder will tend to rotate this frame, whereas if the bearing surfaces were not adapted, as they are here, to coöperate, it might be difficult to secure the rotation of the secondary frame at certain times.

The bow-shaped member 9 extends rearwardly of the secondary frame, and to it there will be attached a laterally curved and vertically disposed rudder 15. To the two members 8, there will be attached laterally extending curved planes 16.

While in the present device, a rudder 15 is depended upon to secure the halfway rotation at the conclusion of each forward movement, other means may be provided for this purpose. Even were the rudder straight, it would be possible to secure such rotation by over-weighting one side of the machine, the weight being placed preferably at some point on the secondary frame, although it might be placed in the supports for the two planes.

The operation of the device will be obvious. The cable 3 will be attached to a wall at one end, or may be held by an operator, the other end then being lowered, which will cause the device to roll down the cable, the so-called propeller rotating as a result of the device's movement through the air. When the device has reached the end of such movement, the secondary frame will rotate through a half circle, such movement being caused by the curved rudder, as will be readily understood, since the wind pressure on the side toward which the rudder is curved, will exceed that on the other side.

The use of a toy which will slide down an inclined cable is, of course, old, but the present device is thought to be more than such a toy, as it appears to resemble an aeroplane in many ways, and to have means to cause it to rotate at the conclusion of movement in either direction.

It will be understood that at the forward end of the bow-shaped member 9 there may be placed a toy figure 17 representing an aviator, in order to carry out the general scheme of an actual aeroplane of the monoplane type, and also to counterbalance the weight of the rudder, thus maintaining the secondary frame in perfect balance on the main frame. It is not necessary that a figure be placed upon the forward end of the secondary frame, as it will be seen that any suitable weight will function exactly as does such a figure, although it will not lend itself to the general appearance of the aeroplane.

The construction of this device is such that, although it may be momentarily displaced from its position, yet it will tend to return to the same as soon as the motion of the cord ceases. Furthermore, by reason of the weight 7 the machine will always tend to return to its normal position.

The present device is of course intended primarily for amusement, and possibly for advertising, as has been already stated. It is thought, however, that another purpose is served, and that is the instruction of those who use the device. Three general principles of physics are here illustrated. These are the law of gravity, which is shown by the machine sliding down the inclined cable, the law of equilibrium, which is shown by the machine's maintaining its balance on account of the weighted ball and also the planes, and thirdly, the resistance of the air and its effect upon a body moving through it, as exemplified by the action of the machine caused by the resistance of both the propeller and the rudder to the air. By being attractive and amusing, the device incites the interest of the users, and is well able to bring out the principles above mentioned, since it is always easier to show and teach physical principles by demonstration, and it is doubly easy to do so when the interest of the learners has been excited by the present device.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of a frame, a plane attached to said frame, a member attached to said plane and adapted to slide along a guide, means adapted to retain the device in a predetermined position in a vertical plane, and other means adapted to retain the device in a predetermined position in a horizontal plane.

2. In a device of the character described, the combination of a frame, a plane attached to said frame, a member attached to said plane and adapted to slide along a guide, counterweight means adapted to retain the device in an upright position, and a rudder attached to said frame and adapted to retain the device in a predetermined position with respect to the direction of movement.

3. In a device of the character described, the combination of a frame, a secondary frame rotatably mounted on said main frame, a plurality of planes attached to said secondary frame and extending laterally therefrom, a member attached to said main frame, extending laterally therefrom, and being adapted to inclose and to slide along a cable, means adapted to retain said device in an upright position during movement along such cable, and means adapted to cause said secondary frame to rotate through a half circle at the conclusion of such movement.

4. In a device of the character described, the combination of a frame; a secondary frame rotatably mounted about a vertical axis on said main frame; a plurality of laterally extending planes attached to said secondary frame; a lateral shaft also attached to said secondary frame; a propeller rotatably mounted on said shaft; a laterally extending member attached to said main frame below the point of attachment of said secondary frame, said member being adapted to inclose and to slide along a cable; means adapted to retain said device in an upright position during movement along such cable; and means adapted to cause said secondary frame to rotate through a half circle at the conclusion of such movement.

5. In a device of the character described, the combination of a frame; a secondary frame rotatably mounted about a vertical axis on said main frame; a plurality of laterally extending planes attached to said secondary frame; a lateral shaft also attached to said secondary frame; a propeller rotatably mounted on said shaft; a laterally extending member attached to said main frame below the point of attachment of said second frame, said member being adapted to inclose and to slide along a cable; a weight attached to said main frame below the point of attachment of said member and adapted to retain said device in an upright position at all times; and means adapted to cause said secondary frame to rotate through a half circle at the conclusion of such movement.

6. In a device of the character described, the combination of a frame; a secondary frame rotatably mounted about a vertical axis on said main frame; a plurality of laterally extending planes attached to said secondary frame; a lateral shaft also attached to said secondary frame; a propeller rotatably mounted on said shaft; a laterally extending member attached to said main frame below the point of attachment of said second frame, said member being adapted to inclose and to slide along a cable; a weight attached to said main frame below the point of attachment of said member and adapted to retain said device in an upright position at all times; and a laterally curved and vertically disposed rudder attached to, and extending from, said secondary frame, said rudder causing said secondary frame to rotate through a half circle at the conclusion of movement of said device along such cable in either direction.

Signed by me this 19th day of February 1912.

E. BALLARD LODGE.

Attested by—
 HORACE B. FAY,
 MARY GLADWELL.